United States Patent [19]

Bielefeldt

[11] 4,265,640
[45] May 5, 1981

[54] METHOD AND APPARATUS FOR SEPARATING PARTICLES FROM A FLOW BY CENTRIFUGAL FORCE

[75] Inventor: Ernst-August Bielefeldt, Hollenstedt, Fed. Rep. of Germany

[73] Assignee: Messerschmitt-Boelkow-Blohm Gesellschaft mit beschraenkter Haftung, Munich, Fed. Rep. of Germany

[21] Appl. No.: 56,052

[22] Filed: Jul. 9, 1979

Related U.S. Application Data

[63] Continuation-in-part of Ser. No. 910,580, May 30, 1978, Pat. No. 4,205,965, which is a continuation-in-part of Ser. No. 717,148, Aug. 24, 1976, abandoned.

[30] Foreign Application Priority Data

Aug. 30, 1975 [DE] Fed. Rep. of Germany ....... 2538664
Jul. 21, 1978 [DE] Fed. Rep. of Germany ....... 2832097

[51] Int. Cl.³ .............................................. B01D 45/12
[52] U.S. Cl. .......................................... 55/1; 55/391; 55/397; 55/439; 55/450; 55/459R; 55/461
[58] Field of Search ..................... 55/1, 391, 396–397, 55/450, 452, 459 R, 461, 439; 209/144, 211; 210/512 R

[56] References Cited

U.S. PATENT DOCUMENTS

| Re. 16,389 | 7/1926 | Garner .................................. 55/395 |
| 474,490 | 5/1892 | Walter .................................... 55/412 |
| 1,689,104 | 10/1928 | Bennett .............................. 55/397 X |
| 3,633,344 | 1/1972 | Blank et al. ....................... 55/452 X |
| 4,001,121 | 1/1977 | Bielefeldt .......................... 55/460 X |

FOREIGN PATENT DOCUMENTS

| 170268 | 2/1952 | Austria ...................................... 55/396 |
| 53412 | 9/1890 | Fed. Rep. of Germany ............. 55/397 |
| 2233437 | 2/1974 | Fed. Rep. of Germany . |
| 31716 | 6/1927 | France ..................................... 55/461 |
| 1375154 | 9/1964 | France ...................................... 55/17 |
| 257121 | 8/1926 | United Kingdom ..................... 55/397 |
| 390053 | 3/1933 | United Kingdom ..................... 55/397 |
| 733786 | 7/1955 | United Kingdom ................... 209/144 |

*Primary Examiner*—Kathleen J. Prunner
*Attorney, Agent, or Firm*—W. G. Fasse; D. F. Gould

[57] ABSTRACT

Solid particles suspended in a flowing gas are separated from the gas by tangentially driving the gas and particles into a substantially cylindrical eddy chamber substantially along the entire axial length of the chamber. Axially arranged suction pipes are connected to suction fans and reach mirror-symmetrically into the eddy chamber for withdrawing the clean gas from a central zone of the chamber. The eddy chamber has end walls through which the suction pipes extend concentrically relative to the longitudinal axis of the cylindrical eddy chamber. Particle exits are provided in the chamber end walls at points to which secondary flows tend to transport the particles. These particle exits are so located that they are in line with the transport direction of the particles by the secondary flows.

10 Claims, 7 Drawing Figures

METHOD AND APPARATUS FOR SEPARATING PARTICLES FROM A FLOW BY CENTRIFUGAL FORCE

CROSS REFERENCE TO RELATED APPLICATION

The present application is a Continuation-In-Part application of Ser. No. 910,580, now U.S. Pat. No. 4,205,965; filed on May 30, 1978 which in turn is a Continuation-In-Part application of Ser. No. 717,148; filed on Aug. 24, 1976. The last mentioned application is now abandoned.

The priority document of German Patent Application No. P 2,538,664.5 is in the official file of U.S. Ser. No. 717,148, which was based on said German Patent Application No. P 2,538,664.5.

BACKGROUND OF THE INVENTION

The present invention relates to a method and apparatus for separating particles from a flow by centrifugal force.

More specifically, the invention relates to a method and apparatus for separating the specific heavier components from a flow of a gaseous medium in which these particles are suspended, whereby centrifugal force is employed for the separation. The flow which includes the gas which is the lightest component of the flow and the heavier particles suspended therein is first diverted from a straight path into a curved path. An eddy flow is caused by the direct contact of the flow with the inner curvature zone of an eddy chamber in which an eddy separation is accomplished by means of a rotating eddy. The specific lighter component, namely the clean gas, is sucked out centrally of the eddy chamber. The flow of the gas with the particles suspended therein is introduced tangentially into the eddy chamber and along the entire width or axial length of the eddy chamber. The removal of the clean gas may be accomplished by two suction pipes connected to suction fans and reaching axially and mirror-symmetrically substantially into the center of the eddy chamber.

German Pat. No. 2,160,415 laid open to public inspection on July 5, 1973, discloses a method as described above. In said German Patent the separated particles are removed tangentially out of the eddy chamber by means of a partial flow which contains a partial volume of the entire gas particle mixture. If it is necessary to collect the particles separated by such a device as disclosed in the above German Patent, a so-called direct separator must be connected to the centrifugal separator downstream thereof.

British Pat. No. 733,786 discloses a centrifugal type dust separator, particularly for multi-cellular plants in which secondary current flows are to be suppressed and in which the ends of a dust separator cell are provided with radially extending outputs. The input of the separator cell extends tangentially.

In U.S. Pat. No. 474,490 (Walter) a dust collector is so arranged that the inlet as well as the dust particle outlet extend tangentially. The inlet and dust outlet extend over the entire axial width of the separator chamber, however in such a manner that the dust is collected by gravity in a downwardly pointing dust hopper. The intentional generation of secondary flows is not disclosed by U.S. Pat. No. 474,490.

In my above mentioned copending application Ser. No. 910,580 secondary flows are intentionally generated. However, there is room for improvement with regard to the removal of the particles.

OBJECTS OF THE INVENTION

In view of the above it is the aim of the invention to achieve the following objects singly or in combination:

to provide a method for the separation of heavier particles from a lighter gas by centrifugal force in such a manner that the particles are transported into a collecting chamber substantially without the aid of a primary flow but with the aid of a secondary flow;

to arrange the exit openings for the separated particles in such a manner that the secondary flow will transport the separated particles directly into such openings without the aid of an external suction;

to construct a centrifugal separator in such a manner that the exit openings for the particles are located axially in the end walls of the separating chamber;

to operate and construct and centrifugal separator in such a manner that its separation efficiency is comparable to electrostatic precipitators or separators operating with cloth filters; and to drive the primary circular eddy flow in the eddy chamber at an r.p.m. of about 50,000.

SUMMARY OF THE INVENTION

According to the invention the axially effective flow components of the secondary flow are utilized to carry the separated particles through openings in the axial end walls of the eddy chamber, preferably without any suction effect at these openings. Thus, the invention provides in a surprisingly simple and inexpensive manner a direct separator which may be advantageously integrated into a dust separator system comprising a plurality of eddy chambers. Further, the present separator may be used as a centrifuge, as a so-called hydroseparator and so forth. The separators according to the invention may be installed in a dust bin or may be connected thereto. Similarly the present devices are suitable for individual use and may be constructed in various sizes.

The present apparatus comprises an eddy chamber which according to the invention is provided with dust removal openings in its axial end walls. These openings are located close to the cylindrical wall of the chamber. In addition, the chamber may be provided with a so-called peeling slot which is known as such. In a further improved embodiment of the invention a crescent shaped channel forming wall member is installed in the eddy chamber whereby apparently secondary flows are created on both sides of the crescent shaped separation wall which forms a flow rotating channel. Dust removal openings are then located adjacent to the crescent shaped wall and adjacent to the outer wall but in the axial end walls of the eddy chamber.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
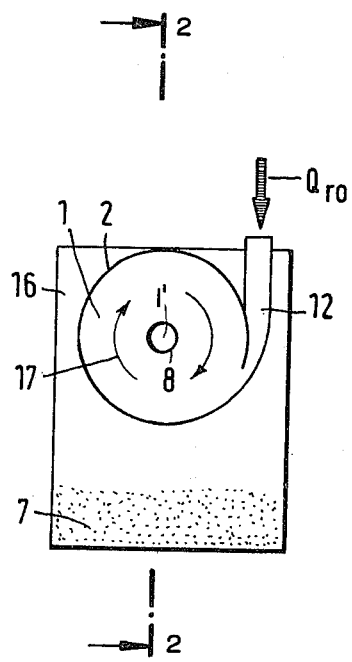
FIG. 1 is a sectional view through a separator apparatus according to the invention along the section line 1—1 in FIG. 2.
Figure 2:
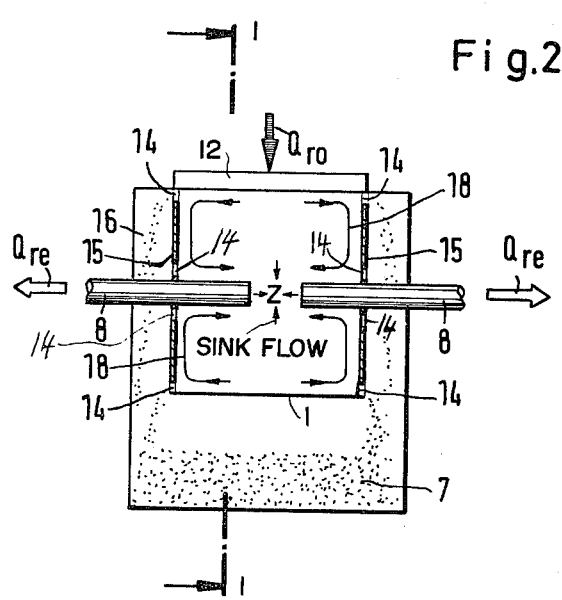
FIG. 2 is a sectional view along section line 2—2 in FIG. 1.

FIGS. 1 and 2 shows a separator apparatus comprising a substantially cylindrical eddy chamber 1 formed by a curved wall 2 and two axial end walls 15 as best seen in FIG. 2. The eddy chamber 1 has a longitudinal central axis 1' which extends perpendicularly to the plane of the drawing in FIG. 1. Two immersion pipes 8 extend mirror-symmetrically and coaxially relative to said central chamber axis 1' into the chamber as best seen in FIG. 2. Suction fans represented by arrows $Q_{re}$ are operatively connected to the immersion pipes 8 for the withdrawal of the clean gas from the eddy chamber. The inner ends of the immersion pipes 8 are spaced from each other so that a substantially point shaped sink flow Z is formed in the zone between the inner ends of the pipes 8.

A "point shaped" sink flow is a sink flow in which the flow lines converge toward a point as shown in FIG. 2.

An inlet channel 12 which extends along the entire axial length of the chamber 1 as best seen in FIG. 2, merges tangentially into the chamber 1 as best seen in FIG. 1. According to the invention the axial end walls 15 of the chamber 1 comprise particle discharge slots 14 which may be located near the outer wall 2 and/or near the pipes 8. The eddy chamber 1 is, for example, enclosed by a particle collecting housing 16 forming with its lower end a bin or bunker 7 from which the particles may be periodically removed, for example manually.

In operation, the flow of gas with the particles suspended therein is forced into the inlet channel 12 as indicated by the arrow $Q_{ro}$, a very rapidly rotating "stationary" eddy is generated in the eddy chamber 1. The fan means for driving the flow $Q_{ro}$ into the chamber 1 are not shown. According to the invention the "stationary" eddy flow constitutes a primary eddy flow 17 rotating at about 50,000 r.p.m. The primary eddy flow 17 induces in the eddy chamber 1 a secondary flow 18 which adjacent to the central axis 1' travels toward the sink flow z and which travels along the inner surface of the walls of the chamber 1 axially outwardly toward the exit openings or slots 14 in the axial end walls 15 of the chamber 1. By utilizing the secondary flow 18 for transporting the particles directly into and through the exit openings 14 the invention achieves a surprisingly high efficiency for centrifugal separators. According to the invention the cleaning efficiency is better than 99.9% of the particles carried in the gas flow $Q_{ro}$. Such a cleaning efficiency has been achieved heretofore only by means of electrostatic precipitators or by cloth type filters. Moreover, the invention removes particles having sizes as small as about one half of a micron.

Due to the "stationary" primary eddy flow 17 the particles are driven radially outwardly toward the inner surfaces of the chamber wall 2 of the eddy chamber 1 to generate a secondary flow 18. The secondary flow 18 moving axially outwardly along the chamber wall 2 entrains the particles thereby transporting them toward the axial end walls 15 of the chamber 1. The chamber end walls divert the secondary flow radially inwardly along the chamber walls 15 and toward the pipes 8. However, due to the exit slots 14 according to the invention, the particles keep travelling in the axial direction and thus out of the chamber 1 into the bin 7. The cleaned gas leaves the eddy chamber through the immersion pipes 8 as shown by the arrows $Q_{re}$. In this way even the finest particles down to a size of about one half of one micron are effectively removed from the flow. Although the finest particles first travel axially inwardly driven by the secondary flow along the immersion pipes 8, the sink flow in the zone Z in combination with the secondary flow cause the finest particles to travel on spiral paths around the pipes 8. The spiral paths have radii which increase radially outwardly in planes extending perpendicularly to the longitudinal axis 1'. In other words, the largest radius of the spiral path is present in the central zone around the sink flow zone Z whereby the finest particles are carried again radially outwardly and back into the axial secondary flow 18 toward the exits 14. Thus, the finest particles do not reach the suction effect zone adjacent to the inner openings of the suction pipes 8, whereby a very efficient separation zone is present adjacent to and around the suction pipes.

Figure 3:
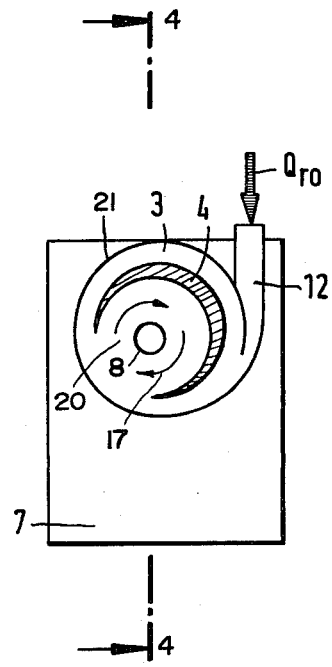
FIG. 3 illustrates a view similar to that of FIG. 1 however with the modification that a crescent shaped separation wall forms two flow channels whereby the sectional view extends along section line 3—3 in FIG. 4.
Figure 4:
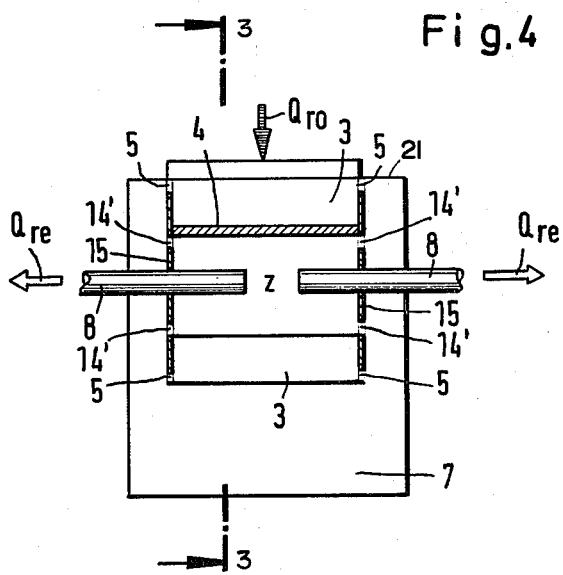
FIG. 4 is a sectional view along section lines 4—4 in FIG. 3.

FIG. 3 shows an eddy chamber 20 within a curved wall 21 in which there is arranged a crescent shaped wall member 4 forming a rotation channel 3 between the crescent member 4 and the curved wall 21. The crescent member 4 has such a shape that the rotation channel 3 as viewed in the radial direction has substantially a constant cross sectional width. The rotation channel 3 extends across the entire axial length of the chamber 20 as best seen in FIG. 4. According to the invention discharge slots 5 are provided in the axial end walls 15 adjacent to the curved wall 21 radially outwardly of the crescent member 4 and further discharge openings 14' are located in the axial end walls of the chamber 20 adjacent to the crescent member 4 but radially inwardly thereof as seen in FIG. 4. Separate secondary flows are generated radially inwardly and outwardly of the crescent member 4 thereby discharging the particles through the discharge openings 5 and 14' into the bin 7.

In the embodiment shown in FIGS. 3 and 4 a very beneficial separation mechanism for the particles dispersed in the gas is achieved because the residence time of the particles in the separation chamber is increased due to the fact that in the central sink flow zone Z only a partial volume of the gas is withdrawn and another proportion of the gas will travel through the rotation channel 3 around the crescent member 4. Thus the longer residence times are achieved for the finest particles in the chamber 20, whereby the transport of the particles radially outwardly around the immersion pipes 8 is facilitated. The flow through the rotation channel 3 is gradually enriched with particles by the continuous supply of the raw or contaminated gas flow as indicated by the arrow $Q_{ro}$ to such an extent, for example, with dust particles, that the so-called limit load is exceeded, whereby these particles are continuously and easily discharged through the discharge slots 5. Thus, the sucked off proportion of clean gas indicated by the arrows $Q_{rc}$ is substantially improved with regard to its quality or rather cleanness.

Figure 5:
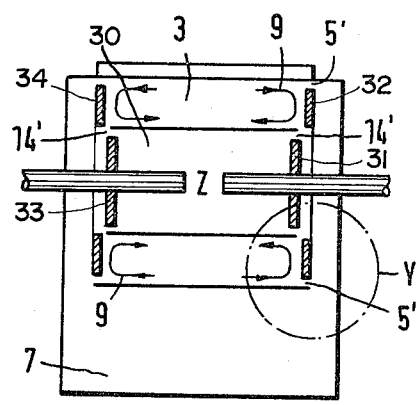
FIG. 5 is a view similar to that of FIG. 4, however, illustrating staggered end walls for the separation chamber proper.
Figure 6:
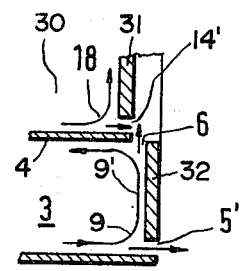
FIG. 6 is an enlargement of the area "Y" in FIG. 5.

In FIGS. 5 and 6 the eddy chamber 30 has end walls 31 and 32 as well as 33 and 34. Slots 5' are provided in the end walls 32 and 34. The end wall 31 is staggered axially inwardly relative to the end wall portion 32. Similarly, the end wall 33 is staggered axially inwardly relative to the wall portion 34. This type of structure takes advantage of the fact that the opening 14' and the opening 6 cooperate in the discharge of particles as indicated by the arrows passing through the opening 14' and the opening 6. Thus, the invention makes quite certain that not only the particles which move axially with the first secondary flow 18 in the chamber 30 are removed through te discharge opening 14', but that also particles which may have remained in the secondary flow 9 in the rotation channel 3 and which are now travelling along a radial path 9' are effectively discharged through the openings 6 located substantially tangentially relative to the portion 9' of the secondary flow 9.

Figure 7:
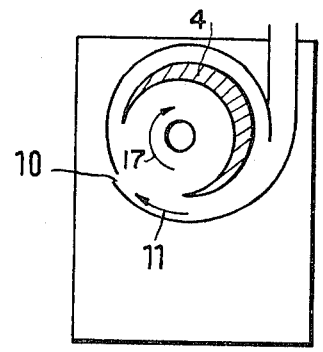
FIG. 7 shows a sectional view similar to that of FIGS. 1 or 3, with a peeling slot in the lateral wall of the separation chamber.

FIG. 7 shows a modification wherein the eddy chamber is provided with a peeling slot 10 which facilitates the removal of the coarser particles in the flow 11 because these coarser particles are accumulated by the centrifugal force along the inside surface of the eddy chamber.

Although the invention has been described with reference to specific exemplary embodiments, it will be appreciated, that it is intended to cover all modifications and equivalents within the scope of the appended claims.

What is claimed is:

1. In a method for separating heavier particles from a lighter gas flow by centrifugal force in an eddy chamber of given length having axially extending eddy chamber wall means and end walls, a central longitudinal axis and a flow entrance extending tangentially into the eddy chamber substantially entirely along said given length, and two suction pipes extending in axial alignment through said end walls substantially mirror-symmetrically into said eddy chamber close to a central zone in said eddy chamber, the improvement comprising the steps of driving said lighter gas flow with the heavier particles suspended therein tangentially into said flow entrance whereby the lighter gas flow with the heavier particles suspended therein enters the eddy chamber substantially along the entire given chamber length and generates a primary substantially circular eddy flow which rotates around said longitudinal axis of the eddy chamber, spacing the inner ends of said suction pipes from each other to cause a sink flow between these inner suction pipe ends, axially withdrawing the flow at least partially through said suction pipes, maintaining in said eddy chamber a secondary flow which travels axially outwardly adjacent the inner surface of the axially extending eddy chamber wall means, radially inwardly along said end walls and axially inwardly upon changing the flow direction from radially inwardly to axially inwardly, locating particle discharge openings in said end walls at least at one location where said secondary flow changes its flow direction, and removing said particles through said discharge openings solely by said secondary flow without any suction applied to said particle discharge openings in said end walls.

2. The method of claim 1, further comprising passing said flow with the particles suspended therein past a peeling slot.

3. The method of claim 1, wherein said locating of said discharge openings involves placing the discharge openings in said end walls where the secondary flow changes its direction from axially outwardly to radially inwardly and where the secondary flow changes its flow direction from radially inwardly to axially inwardly.

4. An apparatus for separating heavier particles from a lighter gas flow by centrifugal force comprising a substantially cylindrical housing forming an eddy chamber having an axially extending wall and end walls, a flow entrance extending tangentially into said eddy chamber along substantially the entire axial length of said eddy chamber, suction means, suction pipes operatively connected to said suction means and extending mirror-symmetrically and axially through said end walls into a central zone of said eddy chamber, said suction pipes extending toward each other sufficiently to cause a sink flow therebetween, and particle exit slots between said end walls and said axially extending wall, said flow in combination with said suction means generating a primary eddy flow and a secondary flow in said eddy chamber, said secondary flow transporting said particles to said particle exit slots without any active gas flow withdrawal at said exit slots.

5. The apparatus of claim 4, wherein said eddy chamber being closed except for said flow entrance, said suction pipes and said particle exit slots.

6. The apparatus of claim 4, further comprising peeling slot means in said axially extending wall, said peeling slot means being circumferentially spaced from said flow entrance.

7. The apparatus of claim 4, further comprising crescent shaped guide wall means located in said eddy chamber and extending along the entire axial length of said axially extending wall, said crescent shaped guide wall means being located substantially coaxially relative to said suction pipes and spaced from both of said axially extending wall and from said suction pipes.

8. The apparatus of claim 7, comprising further particle discharge slots (6, 14') in said end walls adjacent to said crescent shaped guide wall means (4).

9. The apparatus of claim 8, wherein each of said end walls comprises an axially staggered arrangement substantially where said crescent shaped guide wall means meets the end walls, said particle exit slots comprising openings extending axially and further openings extending radially inwardly at said staggered arrangement.

10. The apparatus of claim 4, further comprising dust bin means, said eddy chamber being enclosed in said dust bin means, said particle exit slots leading into said dust bin means, said suction pipes extending substantially horizontally out of said dust bin means.

* * * * *

UNITED STATES PATENT OFFICE
CERTIFICATE OF CORRECTION

Patent No. 4,265,640            Dated   May 5, 1981

Inventor(x)  Ernst-August Bielefeldt

It is certified that error appears in the above-identified patent and that said Letters Patent are hereby corrected as shown below:

Claim 5, line 2, replace "being" by --is--.

Claim 7, line 6, delete "both of".

Signed and Sealed this

Sixth Day of April 1982

|SEAL|

*Attest:*

*Attesting Officer*    GERALD J. MOSSINGHOFF
                      *Commissioner of Patents and Trademarks*